(12) United States Patent
Frasch

(10) Patent No.: US 6,231,216 B1
(45) Date of Patent: May 15, 2001

(54) ARRANGEMENT FOR AUTOMATIC HEADLIGHT ADJUSTMENT

(75) Inventor: Wilhelm Frasch, Oberboihingen (DE)

(73) Assignee: Dr. Ing. h.c.F. Porsche AG, Weissach (DE)

(*) Notice: Subject to any disclaimer, the term of this patent is extended or adjusted under 35 U.S.C. 154(b) by 0 days.

(21) Appl. No.: 09/327,630

(22) Filed: Jun. 8, 1999

(30) Foreign Application Priority Data

Jun. 8, 1998 (DE) .............................................. 198 25 570

(51) Int. Cl.⁷ ...................................................... B60Q 1/10
(52) U.S. Cl. ............................................. 362/464; 362/523
(58) Field of Search .................................... 362/459, 460, 362/464–466, 487, 523

(56) References Cited

U.S. PATENT DOCUMENTS

| | | | |
|---|---|---|---|
| 4,052,609 | 10/1977 | Martin | 362/468 |
| 4,162,424 | * 7/1979 | Zillgitt et al. | 362/465 |
| 5,303,791 | * 4/1994 | Hayashi et al. | 180/79.1 |
| 5,815,935 | * 10/1998 | Fukuda et al. | 33/203.15 |
| 5,896,011 | * 4/1999 | Zillgitt | 362/465 |

FOREIGN PATENT DOCUMENTS

| | | |
|---|---|---|
| 1 630 672 | 6/1971 | (DE) . |
| 24 37 664 A1 | 2/1975 | (DE) . |

* cited by examiner

Primary Examiner—Alan Cariaso
(74) Attorney, Agent, or Firm—Evenson, McKeown, Edwards & Lenahan, P.L.L.C.

(57) ABSTRACT

An arrangement for the automatic adjustment of headlights consists of an adjusting element which interacts with an angle sensor. This arrangement can be connected with at least one control arm of a wheel suspension by means of a holding element which can be fastened to the control arm by means of a clamping pin and which has on its one free end extending beyond the control arm at least one bearing for an adjusting rod of the angle sensor.

23 Claims, 3 Drawing Sheets

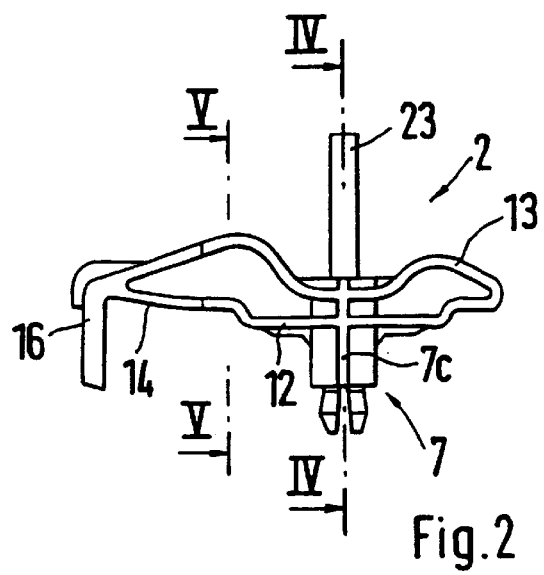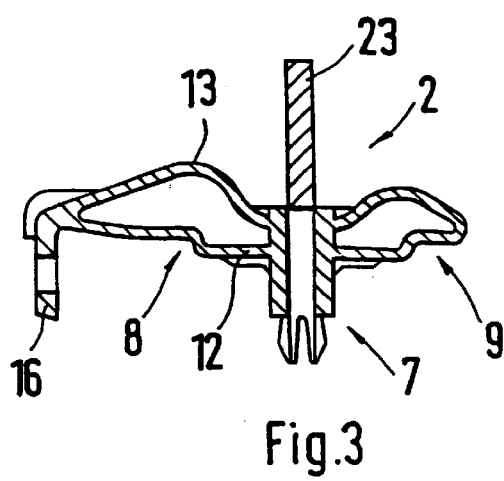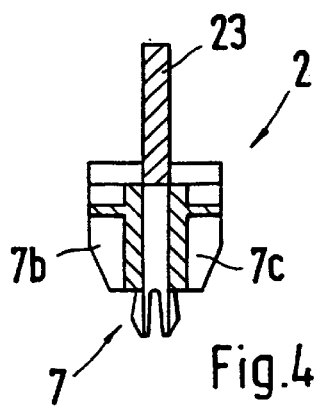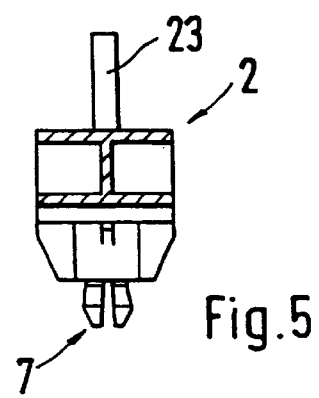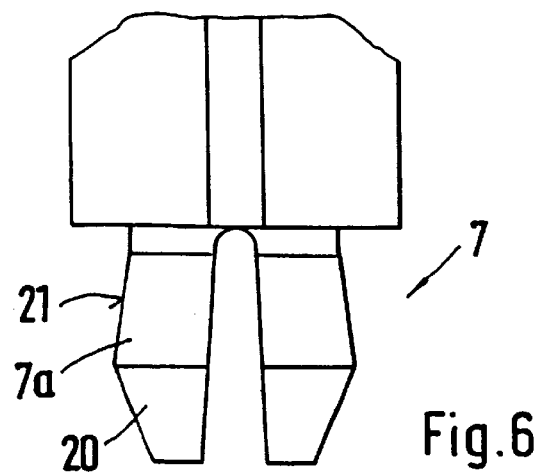

ARRANGEMENT FOR AUTOMATIC HEADLIGHT ADJUSTMENT

BACKGROUND AND SUMMARY OF THE INVENTION

This application claims the priority of German application 198 25 570.5, filed in Germany on Jun. 8, 1998, the disclosure of which is expressly incorporated by reference herein.

The invention relates to an arrangement for the automatic adjusting of headlights by means of an adjusting element which interacts with an angle sensor.

From U.S. Patent Document U.S. Pat. No. 4,052,609, an arrangement is known for the adjustment of headlights of a motor vehicle as a function of the position of a vehicle axle. The headlights are adjusted by means of an adjusting device which is connected with the axle and which consists of an adjusting element which acts upon a transmission device.

It is an object of the invention to provide an arrangement for the automatic adjustment of headlights which can be connected in a simple manner with a control arm of a wheel suspension of a motor vehicle.

According to the invention, this object is achieved by providing an arrangement for the automatic adjustment of headlights by means of an adjusting element which interacts with an angle sensor, comprising a holding element which can be connected with at least one control arm of a vehicle wheel suspension, which holding element can be fastened by means of a clamping pin in the control arm and has a bearing for an adjusting rod of the angle sensor on a free end of the holding element extending beyond the control arm.

Principal advantages achieved by means of the invention consist of the fact that a holding element is to be easily connected in a precisely positionable manner with a control arm of a wheel suspension which is aligned, for example, transversely to the vehicle, and on which holding element an adjusting rod can be fastened which is connected with a swivel lever of an angle sensor. By way of the angle sensor, the headlights are then automatically adjusted corresponding to the position of the wheel suspension or of the position of the vehicle with respect to the road.

The holding element preferably consists of a plastic part and is constructed as a profile element. It is fitted from above onto the control arm and is supported on outer edges of the control arm. So that a secure, non-shiftable position is ensured in the transverse direction, the profile element has two exterior-side steps in which the profile element can support itself on the outer edges of the control arm.

For achieving a sufficient stability, while the weight is simultaneously low, the profile element has a filigree construction and consists of two spaced profiled flat webs which are situated approximately in parallel and which each have a connection on the end side.

For the fastening to the control arm, a vertically arranged clamping pin is provided which has a spreader head which is molded to the two webs while connecting them and which has a rib on both sides which extends along the whole length of the pin.

The clamping pin has a so-called spreader head with spring-type segments and outwardly pointing tension surfaces which can be inserted into an opening of the control arm. A clamping in a bore of the control arm takes place by means of a cylindrical bolt which can be inserted or beaten in and which causes a spreading of the head.

The adjusting rod is connected with the holding element on a jutting end. This jutting end is provided with a bent leg to which the adjusting rod is connected by means of a bearing, such as a ball joint. Correspondingly, the other end of the adjusting rod is also connected with the swivel lever of the angle sensor at which a joint, such as a ball joint, is also provided or may also be provided.

According to another embodiment of the invention, the holding element with the adjusting rod and the bearings can also consist of a one-piece part made of a plastic material.

The bearings on the holding element and on the swivel lever are formed by so-called film hinges, two film hinges being provided on each end of the adjusting rod, which film hinges each have two bending points which are offset with respect to one another by 90°.

The advantage of this arrangement according to the invention is particularly its one-piece characteristic as well as the simple mounting of the arrangement on the control arm by way of the molded-on holding element by means of the clamping pin with the simultaneously two-sided support on the control arm, which results in a secure positioning.

Other objects, advantages and novel features of the present invention will become apparent from the following detailed description of the invention when considered in conjunction with the accompanying drawings.

BRIEF DESCRIPTION OF THE DRAWINGS

FIG. 2 is a lateral view of the holding element of the embodiment of FIG. 1;

FIG. 3 is a longitudinal sectional view of the holding element of FIG. 1;

FIG. 4 is a sectional view of the holding element taken along Line IV—IV of FIG. 2;

FIG. 5 is a sectional view of the holding element taken along Line V—V of FIG. 2;

FIG. 6 is an enlarged representation of the clamping pin with the spreader head.

DETAILED DESCRIPTION OF THE DRAWINGS

Figure 1:
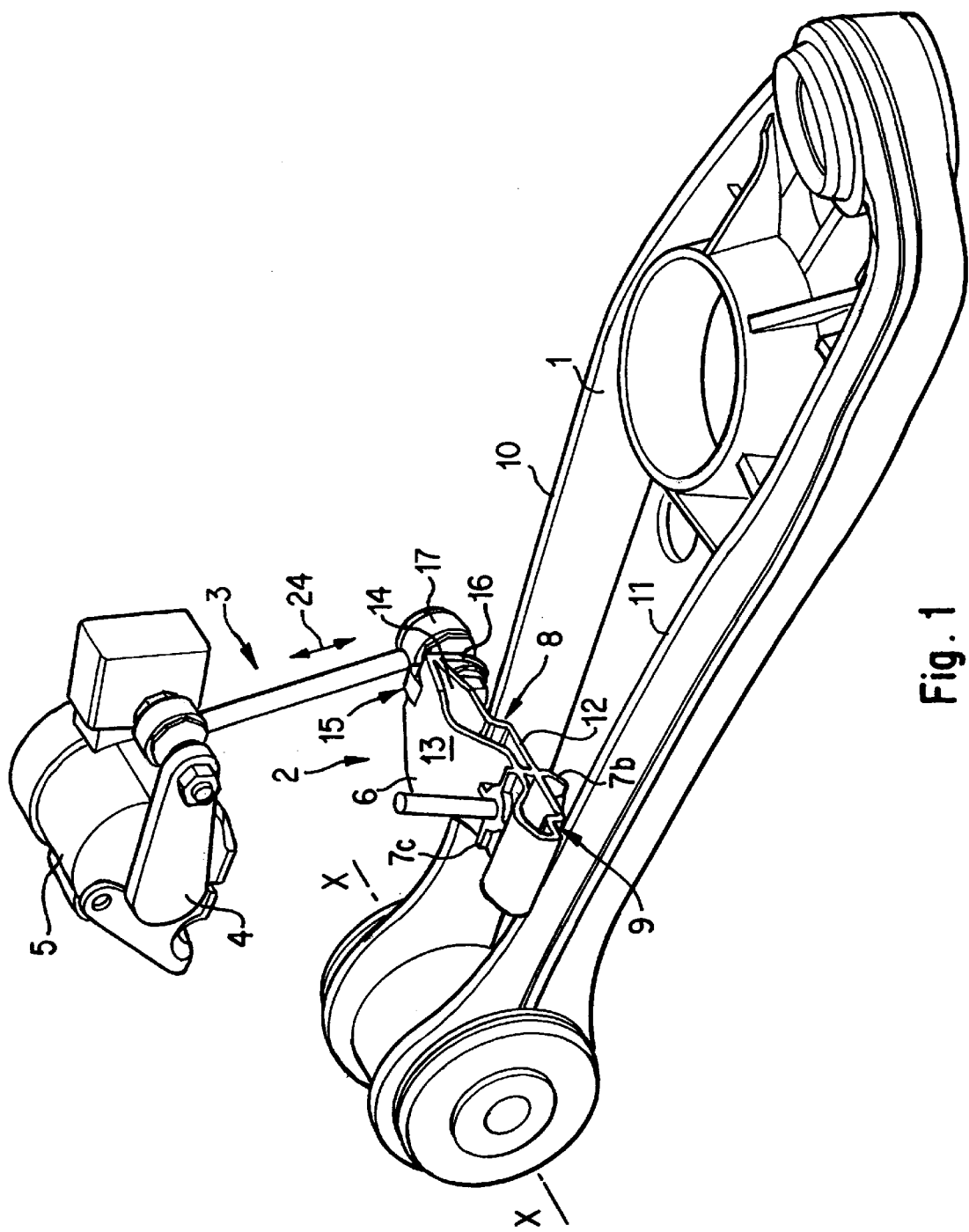
FIG. 1 is a diagrammatic representation of a construction for an automatic headlight adjustment by means of an adjusting rod which is connected with a holding element, constructed according to a preferred embodiment of the invention.

The arrangement according to FIG. 1 comprises essentially a holding element 2 which is connected with a control arm 1 of a wheel suspension and is connected with an adjusting rod 3 which is held on a swivel lever 4 of an angle sensor 5.

The holding element 2 consists of a profile element 6 which extends transversely to the control arm 1 and which can be connected with the control arm 1 by way of a so-called clamping pin 7.

For positioning the holding element 2 on the control arm 1, the holding element 2 has two steps 8, 9 which are supported on outer edges 10, 11 of the control arm 1. Between these steps, a lower-situated web 12 is provided which has a width corresponding to the spacing of the two outer edges 10, 11 with respect to one another.

The holding element 2 has two flat webs 13, 14 which are opposite at a distance and are connected with one another at the end side and have a profiled shape. One free end 15 of the element 2 is provided with a bent leg 16 on which the adjusting rod 3 is held. This adjusting rod 3 is fastened in the leg 16 by means of a screw, a bearing head 17 for receiving a joint, for example, a ball joint, being provided on the adjusting rod 3. The other end of the adjusting rod 3, which faces away from this bearing head 17, is connected by means of a joint, such as a ball joint, with the swivel lever 4 of the angle sensor 5.

The clamping pin 7 is also molded to the holding element 2 and has a spreader head 7a on the end side (FIG. 6) with at least four spring-type segments 20 which have tension surfaces 21 pointing to the outside in the form of barbs and which reach behind a bore in the control arm 1. By inserting a cylindrical pin 23 into the spreader head 7a for fixing purposes, a firm but detachable connection takes place toward the control arm 1.

The molded-on tension pin 7 is arranged in a connecting manner between the two flat webs 13, 14 of the profile element and is provided on both sides with vertically extending ribs 7b and 7c, which extend at least along the whole height of the element 2.

During a swivelling movement of the control arm 1 about a body-side bearing of the vehicle with the horizontal swivelling axis X—X, as the result of a movement of the wheel or the vehicle, the adjusting rod 3 moves in the directions of the arrow 24 and so does the swivelling lever 4 so that the angle sensor 5 is acted upon correspondingly and an automatic headlight adjustment can be controlled.

Figure 7:
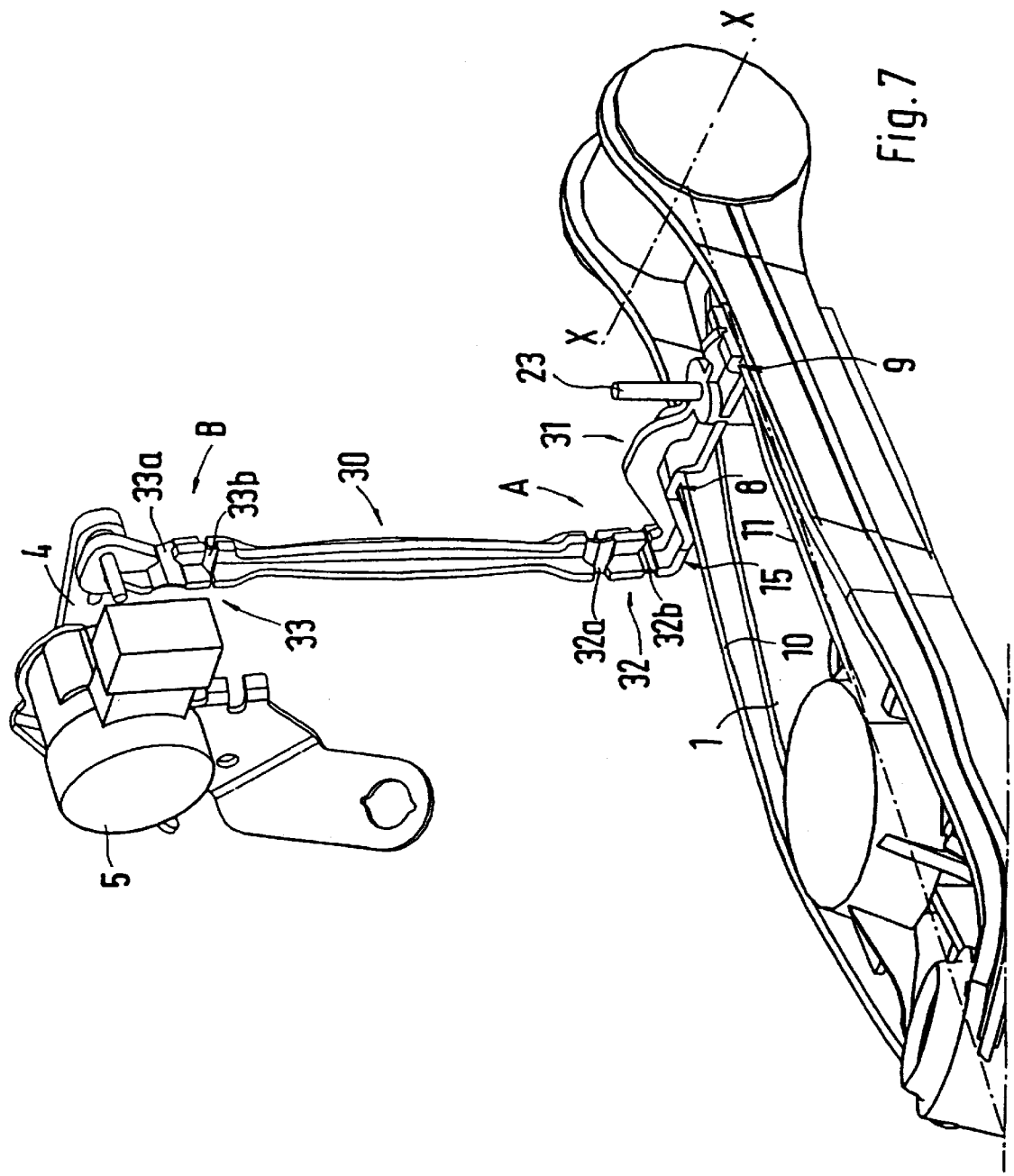
FIG. 7 is a diagrammatic representation of another embodiment of an arrangement with a one-piece construction with the adjusting rod, the holding element and the bearings.

According to another embodiment according to FIG. 7, the adjusting rod 30 with the holding element 31 and the bearings 32, 33 consists of a one-piece plastic part. The fastening on the control arm 1 takes place as in the construction according to FIG. 1. The positioning and the support on the outer edges 10, 11 of the control arm 1 is also almost identical.

In the lower connection area A, the adjusting rod 30 has two bearings 32 which have bending points 32a and 32b offset with respect to one another by 90°. The upper connection area B to the swivel lever 4 of the angle sensor 5 has a corresponding construction. The bearing 33 comprises two bending points 33a, and 33b which are offset with respect to one another by 90°. These bending points 32a, 32b and 33a, 33b are constructed as so-called film hinges.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle headlight adjusting arrangement for a vehicle having a vehicle wheel suspension control arm which in use moves in response to road surface and driving conditions, said adjusting system comprising:
   a headlight angle sensor having a movable adjusting element,
   an adjusting rod connected at a first section of the adjusting rod to the adjusting element,
   a holding element which in use is carried by the control arm, said holding element being connected to a second section of the adjusting rod, and
   a clamping pin operable to fasten the holding element to the control arm.

2. Arrangement according to claim 1, wherein the holding element consists of a profile element with respective step sections, said holding element extending transversely to the control arm and being supported in use on outer edges of the control arm in the respective step sections, and
   wherein a free end of the holding element has a bent construction and a receiving device for receiving a bearing of the adjusting rod.

3. Arrangement according to claim 1, wherein the movable adjusting element of the sensor is a swivel lever, and wherein the adjusting rod is pivotally connected to the holding element about an approximately horizontal axis which is arranged at a vertical distance to another approximately horizontal axis on the swivel lever of the angle sensor.

4. Arrangement according to claim 2, wherein the movable adjusting element of the sensor is a swivel lever, and wherein the adjusting rod is pivotally connected to the holding element about an approximately horizontal axis which is arranged at a vertical distance to another approximately horizontal axis on the swivel lever of the angle sensor.

5. Arrangement according to claim 1, wherein the holding element comprises two flat webs which are opposite and spaced from one another and are connected with one another on an end side, said flat webs being connected in the area of the clamping pin by way of at least one vertical rib.

6. Arrangement according to claim 2, wherein the holding element comprises two flat webs which are opposite and spaced from one another and are connected with one another on an end side, said flat webs being connected in the area of the clamping pin by way of at least one vertical rib.

7. Arrangement according to claim 3, wherein the holding element comprises two flat webs which are opposite and spaced from one another and are connected with one another on an end side, said flat webs being connected in the area of the clamping pin by way of at least one vertical rib.

8. Arrangement according to claim 4, wherein the holding element comprises two flat webs which are opposite and spaced from one another and are connected with one another on an end side, said flat webs being connected in the area of the clamping pin by way of at least one vertical rib.

9. Arrangement according to claim 1, wherein the clamping pin has a spreader head which has outwardly pointing spring-type segments with tension surfaces, and
   wherein a pin bolt is provided which is slidable into the spreader head for fixing purposes.

10. Arrangement according to claim 2, wherein the clamping pin has a spreader head which has outwardly pointing spring-type segments with tension surfaces, and
    wherein a pin bolt is provided which is slidable into the spreader head for fixing purposes.

11. Arrangement according to claim 3, wherein the clamping pin has a spreader head which has outwardly pointing spring-type segments with tension surfaces, and
    wherein a pin bolt is provided which is slidable into the spreader head for fixing purposes.

12. Arrangement according to claim 5, wherein the clamping pin has a spreader head which has outwardly pointing spring-type segments with tension surfaces, and
    wherein a pin bolt is provided which is slidable into the spreader head for fixing purposes.

13. Arrangement according to claim 8, wherein the clamping pin has a spreader head which has outwardly pointing spring-type segments with tension surfaces, and
    wherein a pin bolt is provided which is slidable into the spreader head for fixing purposes.

14. Arrangement according to claim 1, wherein the adjusting rod and the holding element are formed together as a one-piece element which has bearings for respective upper and lower swivel axes.

15. Arrangement according to claim 14, wherein the bearings include film hinges and the swivel axes are formed by bending points of the film hinges.

16. Arrangement according to claim 14, wherein the lower and upper swivel axes are horizontal and are arranged to be offset by 90° with respect to one another.

17. Arrangement according to claim 15, wherein the lower and upper swivel axes are horizontal and are arranged to be offset by 90° with respect to one another.

18. A motor vehicle headlight adjusting system for a vehicle having a vehicle wheel suspension control arm which in use moves in response to road surface and driving conditions, said adjusting system comprising:

a headlight angle sensor having a swivel lever, an adjusting rod pivotally connected at a first section of the adjusting rod to the swivel lever, a holding element which in use is carried by the control arm, said holding element being pivotally connected to a second section of the adjusting rod, and a clamping pin operable to fasten the holding element to the control arm.

19. A motor vehicle headlight adjusting system according to claim 17, wherein the holding element consists of a profile element with respective step sections, said holding element extending transversely to the control arm and being supported in use on outer edges of the control arm in the respective step sections.

20. A motor vehicle headlight adjusting system according to claim 19, wherein a free end of the profile element has a bent construction and a receiving device for receiving a bearing of the adjusting rod.

21. A motor vehicle headlight adjusting system according to claim 18, wherein the clamping pin has a spreader head which has outwardly pointing spring-type segments with tension surfaces, and wherein a pin is provided which is slidable into the spreader head for fixing purposes.

22. A motor vehicle headlight adjusting system according to claim 18, wherein the adjusting rod and the holding element are formed together as a one-piece element which has bearings for respective upper and lower swivel axes, the bearings consisting of film hinges and the swivel axes being formed by bending points of the film hinges.

23. A motor vehicle headlight adjusting system according to claim 22, wherein the lower and upper swivel axes are horizontal and are arranged to be offset by 90° with respect to one another.

* * * * *